US011112005B2

(12) United States Patent
    Bulgrien

(10) Patent No.: US 11,112,005 B2
(45) Date of Patent: Sep. 7, 2021

(54) TRANSMISSION SYSTEM FOR A WORK VEHICLE

(71) Applicant: CNH Industrial America LLC, New Holland, PA (US)

(72) Inventor: Garth Harvey Bulgrien, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 834 days.

(21) Appl. No.: 15/939,055

(22) Filed: Mar. 28, 2018

(65) Prior Publication Data
    US 2019/0301599 A1    Oct. 3, 2019

(51) Int. Cl.
    F16H 61/02    (2006.01)
    F16H 37/06    (2006.01)
    F16H 61/684   (2006.01)
    F16H 37/04    (2006.01)
    B60K 17/02    (2006.01)
    F16H 3/08     (2006.01)
    F16H 3/38     (2006.01)
    F16H 3/22     (2006.01)

(52) U.S. Cl.
    CPC ......... F16H 61/0246 (2013.01); B60K 17/02 (2013.01); F16H 3/08 (2013.01); F16H 37/06 (2013.01); F16H 61/0248 (2013.01); F16H 61/684 (2013.01); B60Y 2200/221 (2013.01); B60Y 2300/18041 (2013.01); F16H 3/22 (2013.01); F16H 3/38 (2013.01); F16H 2037/049 (2013.01); F16H 2312/08 (2013.01); F16H 2312/09 (2013.01)

(58) Field of Classification Search
    CPC .... F16H 61/0246; F16H 37/06; F16H 61/684; F16H 2037/049; F16H 2312/09
    USPC .................................................... 74/335, 360
    See application file for complete search history.

(56) References Cited

U.S. PATENT DOCUMENTS

| | | | |
|---|---|---|---|
| 4,474,082 A | 10/1984 | Spokas et al. | |
| 4,530,416 A | 7/1985 | Kassai | |
| 4,771,647 A | 9/1988 | Stevens | |
| 4,989,470 A | 2/1991 | Bulgrien | |
| 5,353,662 A | 10/1994 | Vaughters | |
| 5,450,768 A | 9/1995 | Bulgrien et al. | |
| 6,131,475 A | 10/2000 | Riedhammer | |
| 6,397,693 B1 | 6/2002 | Umemoto et al. | |

(Continued)

Primary Examiner — Ha Dinh Ho
(74) Attorney, Agent, or Firm — Rickard K. DeMille; Rebecca L. Henkel

(57) ABSTRACT

A transmission system for a work vehicle includes a transmission. The transmission includes one or more input shafts, one or more output shafts, and shafts disposed in-between. The transmission includes gear sets disposed on the shafts, wherein the gear sets include intermediate gear sets. The transmission includes clutches disposed along the shafts, wherein each of the clutches is configured to selectively couple a respective gear set of the gear sets corresponding to a respective power flow path of the transmission. The transmission also includes a forward coupler and a reverse coupler each disposed on one of the shafts. The transmission system also includes a controller configured to receive a signal indicative of a shuttle shift, and in response to receiving the signal, instruct the clutches to stop rotation of the intermediate gear sets and subsequently shuttle shift between forward and reverse directions.

20 Claims, 7 Drawing Sheets

(56) References Cited

U.S. PATENT DOCUMENTS

| | | | |
|---|---|---|---|
| 6,845,682 B1 | 1/2005 | Bulgrien | |
| 7,500,410 B2 | 3/2009 | Tsuji | |
| 8,380,408 B2 * | 2/2013 | Hyodo | E02F 9/2083 |
| | | | 701/64 |
| 8,855,870 B2 * | 10/2014 | Hyodo | E02F 9/202 |
| | | | 701/50 |
| 9,091,221 B2 * | 7/2015 | Hyodo | F02D 29/02 |
| 9,097,329 B2 | 8/2015 | Vitasalo et al. | |
| 9,140,345 B2 | 9/2015 | Dix et al. | |
| 9,255,386 B2 * | 2/2016 | Kikuchi | B60H 1/00378 |
| 9,261,180 B2 | 2/2016 | Rintoo | |
| 9,285,015 B2 | 3/2016 | Akerblom et al. | |
| 9,556,954 B2 | 1/2017 | Hou et al. | |
| 10,071,629 B2 * | 9/2018 | Aoki | F16H 63/50 |
| 2008/0271940 A1 | 11/2008 | De Craemer et al. | |
| 2017/0087983 A1 | 3/2017 | Park et al. | |

* cited by examiner

| SPEED | F | R | IN1 | IN2 | MID1 | MID2 | OUT1 | OUT2 |
|---|---|---|---|---|---|---|---|---|
| 1 | X |   | X |   | X |   | X |   |
| 2 | X |   |   | X | X |   | X |   |
| 3 | X |   | X |   |   | X | X |   |
| 4 | X |   |   | X |   | X | X |   |
| 5 | X |   | X |   | X |   |   | X |
| 6 | X |   |   | X | X |   |   | X |
| 7 | X |   | X |   |   | X |   | X |
| 8 | X |   |   | X |   | X |   | X |
| 1 |   | X | X |   | X |   | X |   |
| 2 |   | X |   | X | X |   | X |   |
| 3 |   | X | X |   |   | X | X |   |
| 4 |   | X |   | X |   | X | X |   |
| 5 |   | X | X |   | X |   |   | X |
| 6 |   | X |   | X | X |   |   | X |
| 7 |   | X | X |   |   | X |   | X |
| 8 |   | X |   | X |   | X |   | X |

| SPEED | F | R | A | B | C | IN1 | IN2 | 1&8 | 2&7 | 3&6 | L | H |
|---|---|---|---|---|---|---|---|---|---|---|---|---|
| 1 | X |   | X |   |   |   |   |   |   |   | X |   |
| 2 | X |   |   | X |   | X |   | X |   |   | X |   |
| 3 | X |   |   |   | X | X |   | X |   |   | X |   |
| 4 | X |   | X |   |   | X |   |   | X |   | X |   |
| 5 | X |   |   | X |   | X |   |   | X |   | X |   |
| 6 | X |   |   |   | X | X |   |   | X |   | X |   |
| 7 | X |   | X |   |   | X |   |   |   | X | X |   |
| 8 | X |   |   | X |   | X |   |   |   | X | X |   |
| 9 | X |   |   |   | X | X |   |   |   | X | X |   |
| 10 | X |   | X |   |   | Opt | X |   |   |   | X |   |
| 11 | X |   |   | X |   | Opt | X |   |   |   | X |   |
| 12 | X |   |   |   | X | Opt | X |   |   |   | X |   |
| 13 | X |   | X |   |   | X | Opt |   |   |   |   | X |
| 14 | X |   |   | X |   | X | Opt |   |   |   |   | X |
| 15 | X |   |   |   | X | X | Opt |   |   |   |   | X |
| 16 | X |   | X |   |   |   | X | X |   |   |   | X |
| 17 | X |   |   | X |   |   | X | X |   |   |   | X |
| 18 | X |   |   |   | X |   | X | X |   |   |   | X |
| 19 | X |   | X |   |   |   | X |   | X |   |   | X |
| 20 | X |   |   | X |   |   | X |   | X |   |   | X |
| 21 | X |   |   |   | X |   | X |   | X |   |   | X |
| 22 | X |   | X |   |   |   | X |   |   | X |   | X |
| 23 | X |   |   | X |   |   | X |   |   | X |   | X |
| 24 | X |   |   |   | X |   | X |   |   | X |   | X |

| SPEED | F | R | A | B | C | IN1 | IN2 | 1&8 | 2&7 | 3&6 | L | H |
|---|---|---|---|---|---|---|---|---|---|---|---|---|
| 1 |   | X | X |   |   |   |   |   |   |   | X |   |
| 2 |   | X |   | X |   | X |   | X |   |   | X |   |
| 3 |   | X |   |   | X | X |   | X |   |   | X |   |
| 4 |   | X | X |   |   | X |   |   | X |   | X |   |
| 5 |   | X |   | X |   | X |   |   | X |   | X |   |
| 6 |   | X |   |   | X | X |   |   | X |   | X |   |
| 7 |   | X | X |   |   | X |   |   |   | X | X |   |
| 8 |   | X |   | X |   | X |   |   |   | X | X |   |
| 9 |   | X |   |   | X | X |   |   |   | X | X |   |
| 10 |   | X | X |   |   | Opt | X |   |   |   | X |   |
| 11 |   | X |   | X |   | Opt | X |   |   |   | X |   |
| 12 |   | X |   |   | X | Opt | X |   |   |   | X |   |
| 13 |   | X | X |   |   | X | Opt |   |   |   |   | X |
| 14 |   | X |   | X |   | X | Opt |   |   |   |   | X |
| 15 |   | X |   |   | X | X | Opt |   |   |   |   | X |
| 16 |   | X | X |   |   |   | X | X |   |   |   | X |
| 17 |   | X |   | X |   |   | X | X |   |   |   | X |
| 18 |   | X |   |   | X |   | X | X |   |   |   | X |
| 19 |   | X | X |   |   |   | X |   | X |   |   | X |
| 20 |   | X |   | X |   |   | X |   | X |   |   | X |
| 21 |   | X |   |   | X |   | X |   | X |   |   | X |
| 22 |   | X | X |   |   |   | X |   |   | X |   | X |
| 23 |   | X |   | X |   |   | X |   |   | X |   | X |
| 24 |   | X |   |   | X |   | X |   |   | X |   | X |

TRANSMISSION SYSTEM FOR A WORK VEHICLE

BACKGROUND

The disclosure relates generally to a transmission system for a work vehicle.

Transmissions are used in agricultural and construction equipment to transmit power from power sources, such as internal combustion engines, to equipment for accomplishing a desired task. For example, transmissions are used to transmit power to wheels and/or tracks of a work vehicle. A powershift transmission is a transmission that controls the application and release of multiple clutches to maintain a torque path through the transmission while switching between gears. A powershift transmission may include a power shuttle unit (e.g., a power shuttle transmission) to enable the work vehicle to shuttle between forward and reverse directions within a short duration. The power shuttle transmission usually includes multi-plate clutches to shift between forward and reverse directions. However, these multi-plate clutches may be subjected to high relative speeds within the clutches (e.g., between counter-rotating plates of forward and reverse clutches), which may result in high parasitic losses due to clutch drag.

BRIEF DESCRIPTION

In one embodiment, a transmission system for a work vehicle includes a transmission, which includes one or more input shafts coupled to an input, one or more output shafts coupled to a load, a plurality of shafts disposed between the one or more input shafts and the one or more output shafts. The transmission includes a plurality of gear sets disposed on the plurality of shafts, wherein the plurality of gear sets include intermediate gear sets. The transmission includes a plurality of clutches disposed along the plurality of shafts, wherein each of the plurality of clutches is configured to selectively couple a respective gear set of the plurality of gear sets corresponding to a respective power flow path of the transmission. The transmission also includes a forward coupler disposed on one of the plurality of shafts and a reverse coupler disposed on one of the plurality of shafts. The transmission system also includes a controller communicatively coupled to the plurality of clutches, the forward coupler, and the reverse coupler, wherein the controller is configured to receive a signal indicative of a shuttle shift, and in response to receiving the signal, instruct the plurality of clutches to stop rotation of the intermediate gear sets and subsequently swap engagement of the forward coupler and the reverse coupler to shuttle shift between forward and reverse directions.

In another embodiment, a method for shuttle shifting a work vehicle, via a controller, includes receiving a signal indicative of a shuttle shift, and in response to receiving the signal, instructing a plurality of clutches to stop rotation of intermediate gear sets of a plurality of gear sets disposed on a plurality of shafts, wherein the plurality of shafts are disposed between one or more input shafts coupled to an input and one or more output shafts coupled to a load, and each of the plurality of clutches is configured to selectively couple a respective gear set of the plurality of gear sets corresponding to a respective power flow path of a transmission of the work vehicle. The method also includes subsequently instructing swapping engagement of a forward coupler and a reverse coupler to shuttle shift between forward and reverse directions, and instructing modulating the one or more output shafts during the shuttle shift.

In a further embodiment, an apparatus includes at least one non-transitory memory storing instructions for execution by a processor. The instructions include instructions to receive a signal indicative of a shuttle shift. The instructions include instructions to a plurality of clutches to stop rotation of intermediate gear sets of a plurality of gear sets disposed on a plurality of shafts of a transmission, wherein the plurality of clutches are disposed along the plurality of shafts disposed between one or more input shafts coupled to an input and one or more output shafts coupled to a load, wherein each of the plurality of clutches is configured to selectively couple a respective gear set of the plurality of gear sets corresponding to a respective power flow path of the transmission. The instructions also include instructions to swap engagement of a forward coupler and a reverse coupler to shuttle shift between forward and reverse directions and instructions to modulate a pressure applied to a respective output clutch of the plurality of clutches to modulate rotation of the one or more output shafts during the shuttle shift.

DRAWINGS

These and other features, aspects, and advantages of the present disclosure will become better understood when the following detailed description is read with reference to the accompanying drawings in which like characters represent like parts throughout the drawings, wherein:

FIG. 4 is an embodiment of a shift diagram corresponding to gear ratio changes within the transmission of FIG. 3, in accordance with the present disclosure;

FIG. 7 is a an embodiment of shift diagram corresponding to gear ratio changes within the transmission of FIG. 6, in accordance with the present disclosure.

DETAILED DESCRIPTION

A transmission using clutches (e.g., forward and reverse clutches) to shuttle between forward and reverse directions may have counter-rotating plates in the clutches. Such counter rotating plates may result in high parasitic losses due to clutch drag. This disclosure relates to a transmission that uses forward and reverse couplers, synchronizers, or both, in place of forward and reverse clutches. In general, synchronizers may drag much less than clutches, and couplers may have substantially no drag. As such, the disclosed transmission may have a reduced parasitic loss as compared to a conventional transmissions that uses clutches for shuttling between forward and reverse directions.

Figure 1:
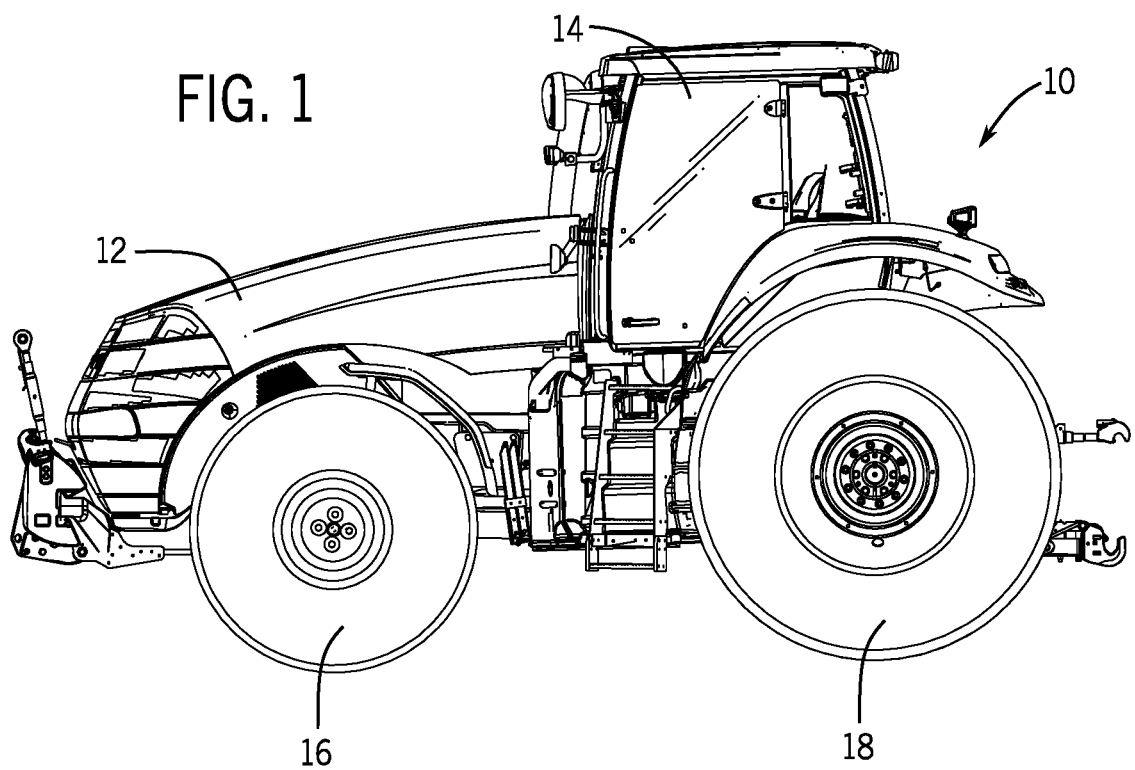
FIG. 1 is a side view of an embodiment of a work vehicle that may employ a transmission system, in accordance with the present disclosure.

With the foregoing in mind, FIG. 1 is a side view of an embodiment of a work vehicle 10 that may employ a transmission system. The work vehicle 10 may be any suitable type of loader, tractor, grader, backhoe, forklift, agricultural vehicle, or any other suitable work vehicle that utilizes a transmission. The work vehicle 10 has a body 12 that typically houses an engine, transmission, and power train. Further, the work vehicle 10 has a cabin 14 where an operator may sit or stand to operate the work vehicle 10. The work vehicle 10 has two front wheels 16 and two rear wheels 18 that rotate to move the work vehicle 10. The engine of the work vehicle 10 may drive the front wheels 16 and/or the back wheels 18 using a transmission. For example, a full powershift transmission system may transfer power from the engine to the front wheels 16 and/or the back wheels 18. While the wheels 16 and 18 are illustrated in FIG. 1, the wheels 16 and/or wheels 18 may be tracks.

Figure 2:
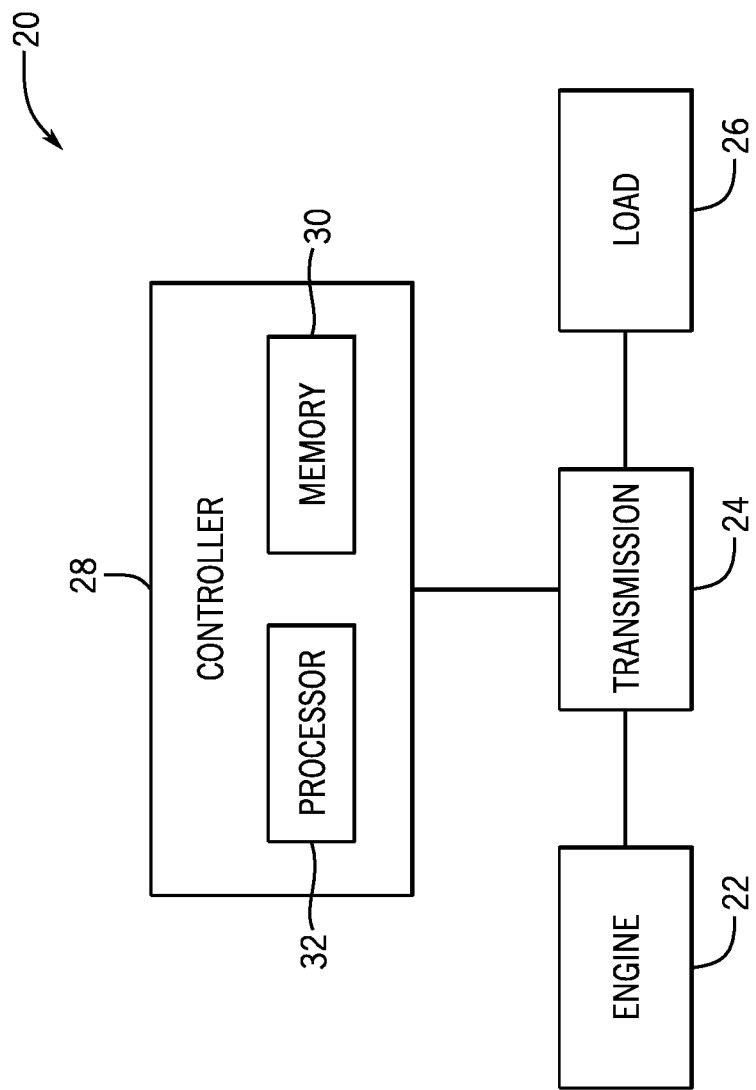
FIG. 2 is a block diagram of an embodiment of a transmission system that may be used in the work vehicle of FIG. 1, in accordance with the present disclosure.

FIG. 2 is a block diagram of an embodiment of a transmission system 20 that may be used in the work vehicle 10 of FIG. 1. An engine 22 (e.g., an internal combustion engine) provides power to drive a transmission 24 of the transmission system 20. The transmission 24 may include a hydraulic system, a planetary gear unit, seals and gaskets, a torque converter, a modulator, sensor(s), other suitable components, or a combination thereof. Output from the transmission 24 drives a load 26, such as the wheels of the work vehicle. The transmission system 20 furthers include a controller 28 configured to control various systems and units within the transmission 24. As illustrated, the controller 28 includes one or more memory devices 30 and one or more processors 32. For example, the one or more memory devices 30 may include volatile memory, such as random access memory (RAM), and/or non-volatile memory, such as read-only memory (ROM), optical drives, hard disc drives, solid-state drives, or a combination thereof. Additionally, the one or more processors 32 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, ASICs, and other programmable circuits. The one or more memory devices 30 (e.g., non-transitory computer-readable medium/memory circuitry) may store one or more sets of instructions (e.g., processor-executable instructions) to operate the transmission 24. In operation, the controller 28 uses the one or more processors 32 to execute instructions stored in the one or more memory devices 30 to control the transmission 24. For example, the controller 28 may receive instructions to cause various clutches to be engaged/disengaged to cause gear ratio changes while the work vehicle 10 is moving (e.g., at different speeds).

Figure 3:
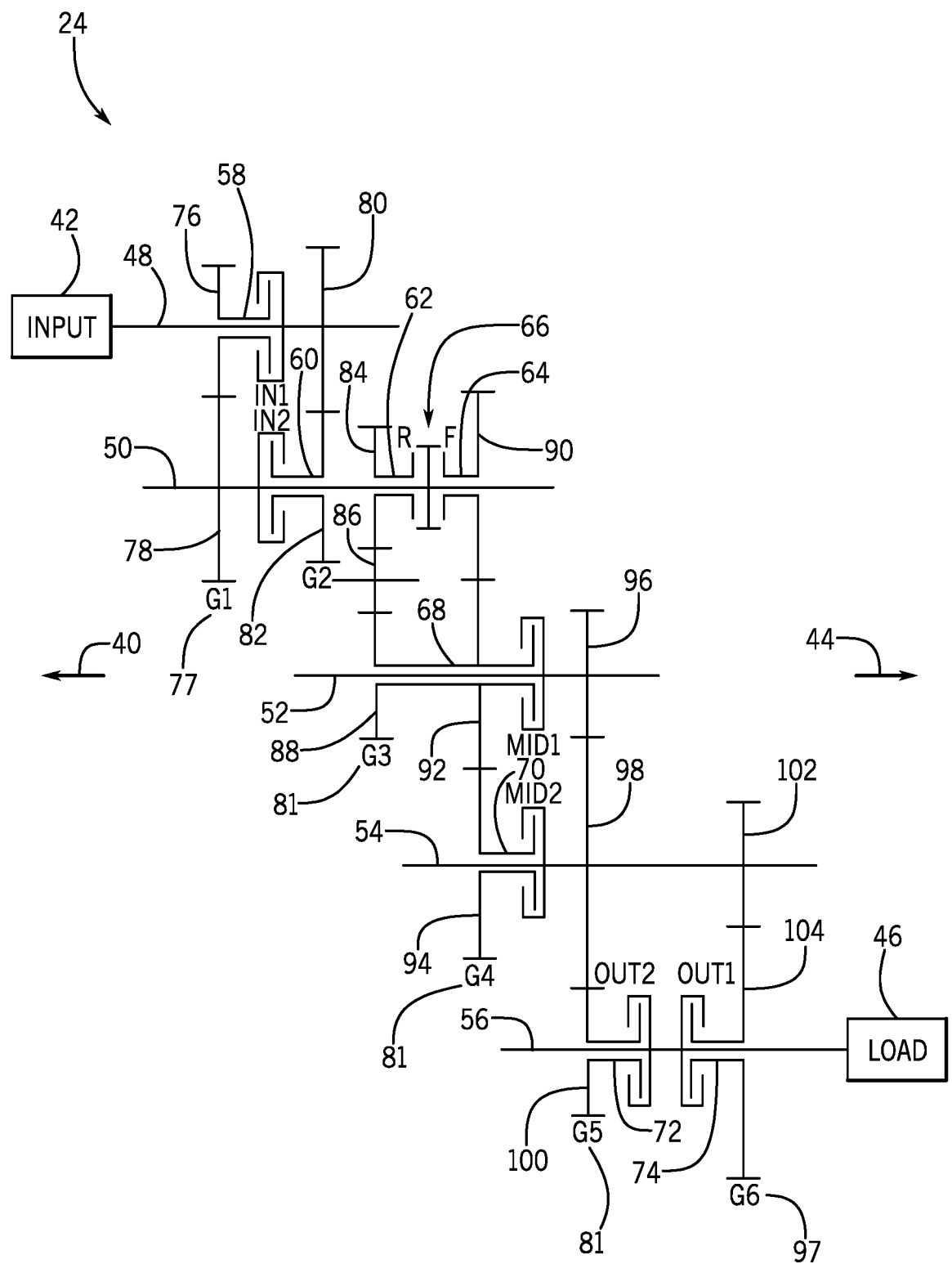
FIG. 3 is a schematic diagram of an embodiment of a transmission that may be used within the transmission system of FIG. 2, in accordance with the present disclosure.

FIG. 3 is a schematic diagram of an embodiment of a transmission 24 that may be used within the transmission system 20 of FIG. 2. In the following descriptions, an axial direction 40 pointing toward an input 42 is referred to as "front", whereas an axial direction 44 pointing toward a load or output 46 is referred to as "rear". The input 42 may be a motor or the engine 22 and the load or output 46 may be the load 26 as shown in FIG. 2. In the illustrated embodiment, the transmission 24 includes an input shaft or a first shaft 48, a second shaft 50, a third shaft 52, a fourth shaft 54, and an output shaft 56, that are parallel to one another. The input shaft 48 is driven by the input 42, and a shaft 58 is selectively fixedly coupled to the input shaft 48 by a clutch IN1. A shaft 60 is selectively fixedly coupled to the second shaft 50 by a clutch IN2. A shaft 62 and a shaft 64 are selectively fixedly coupled to the second shaft 50 by a forward-reverse coupler 66. The forward-reverse coupler 66 includes a forward coupler F and a reverse coupler R, such that the shaft 62 may be selectively fixedly coupled to the second shaft 50 by the reverse coupler R, and the shaft 64 may be selectively fixedly coupled to the second shaft 50 by the forward coupler F. In some embodiments, one or both of the forward and reverse couplers F and R may include synchronizer(s) (e.g., a forward synchronizer for the forward coupler F, a reverse synchronizer for the reverse coupler R, or both). A shaft 68 is selectively fixedly coupled to the third shaft 52 by a clutch MID1, and a shaft 70 is selectively fixedly coupled to the fourth shaft 54 by a clutch MID2. A shaft 72 is selectively fixedly coupled to the output shaft 56 by a clutch OUT2, and a shaft 74 is selectively fixedly coupled to the output shaft 56 by a clutch OUT1.

The transmission 24 includes shafts disposed between the input shaft 48 and the output shaft 56, such as the second, third, and fourth shafts 50, 52, and 54. Arranged between the input shaft 48 and the output shaft 56 along the axial direction pointing toward the rear 44, are six gear sets G1, G2, G3, G4, G5, and G6 that are each formed by respective gears 76/78, 80/82, 84/86/88, 90/92/94, 96/98/100, and 102/104. In the illustrated embodiment, the gear set G1 is referred to as a front gear set 77, the gear sets G3, G4, and G5 are referred to as intermediate gear sets 81, and the gear set G6 is referred to as a rear gear set 97. The gears 76 and 78 are fixedly coupled to the shaft 58 and the second shaft 50, respectively, the gears 80 and 82 are fixedly coupled to the input shaft 48 and the shaft 60, respectively, and the gears 84 and 88 are fixedly coupled to the shafts 62 and 68, respectively, while the gear 86 is coupled to both the gears 84 and 88. The gear 86 may be an idler gear (e.g., a gear wheel that is inserted between two or more other gear wheels) that may be used to change the direction of rotation of the output shaft 56. The gears 90, 92, and 94 are fixedly coupled to the shafts 64, 68, and 70, respectively, the gears 96, 98, and 100 are fixedly coupled to the third shaft 52, the fourth shaft 54, and the shaft 72, respectively, and the gears 102 and 104 are fixedly coupled to the fourth shaft 54 and the shaft 74, respectively. The clutches IN1 and IN2 are disposed between the gear sets G1 and G2, the forward-reverse coupler 66 is disposed between the gear sets G3 and G4, the clutches MID1 and MID2 are disposed between the gear sets G4 and G5, and the clutches OUT2 and OUT1 are disposed between the gear sets G5 and G6. The clutches IN1 and IN2 are fixedly coupled to the input shaft 48 and the second shaft 50, respectively, the clutches MID1 and MID2 are fixedly coupled to the shafts 52 and 54, respectively, and the clutches OUT1 and OUT2 are fixedly coupled to the output shaft 56.

In addition, the transmission 24 of FIG. 3 may include one or more speed sensors, each configured to output a respective signal indicative of the rotational speed of a respective shaft. The speed sensor(s) may include reflective sensor(s), interrupter sensor(s), optical sensor(s), magnetic sensor(s), Hall-effect sensor(s), other suitable types of sensor(s), or a combination thereof. The speed sensor(s) may continuously, periodically, or upon receiving an instruction from the controller 28, measure and output signals indicative of rotational speed to the controller 28. Based on the signals from the speed sensor(s), the controller 28 may determine the rotational speed of respective shaft(s) of the transmission 24 and may determine whether respective clutch(es) of the transmission 24 are locked-up. For example, the speed sensor(s) may measure and output signals indicative of rotational speeds of the respective shaft(s), such that the controller 28 may determine that the respective shaft(s) have stopped rotation. Furthermore, the speed sensor(s) may measure and output signals indicative of rotational speeds of the shaft 74 and the output shaft 56, such that the controller 28 may determine that the clutch OUT1 is locked-up (e.g., the shaft 74 and the output shaft 56 are rotating at the same or substantially the same speed).

The clutches described herein may be any suitable type(s) of clutch(es) including dry clutch(es), wet clutch(es), single/multi plate clutch(es), centrifugal clutch(es), pneumatic or hydraulic clutch(es), electromagnetic clutch(es), or any combination thereof. Each of the clutches may be configured to selectively couple a gear to a shaft or selectively couple a shaft to another shaft upon receiving a control signal from the controller (e.g., the controller 28). The couplers described herein may be any suitable type(s) of coupler(s) including gear coupler(s), disc coupler(s), jaw coupler(s), another suitable coupler(s), or any combination thereof. In addition, a coupler may include a synchronizer (e.g., a coupler having a synchronizer is referred to as a "synchronizer"). The synchronizers described herein may be any suitable type(s) of synchronizer(s) including single-cone synchronizer(s), dual-cone synchronizer(s), triple-cone synchronizer(s), another suitable type of synchronizer(s), or any combination thereof. Each of the couplers may be configured to selectively allow engagement of gears, engagement of a gear and a shaft, or engagement of shafts (e.g., synchronizing the rotation speeds of the respective engaging components) upon receiving a control signal from the controller (e.g., the controller 28).

The described system of gears and shafts can be actuated with the clutches (IN1, IN2, MID1, MID2, OUT1, OUT2) and the forward-reverse coupler 66 to achieve different gear ratios (e.g., speeds) between the input shaft 48 and the output shaft 56 in forward and reverse directions. For example, the clutches and the forward-reverse coupler 66 may be controlled (e.g., via the controller 28) to control the engagement/disengagement of each clutch and the forward-reverse coupler 66 with their respective gear(s) and/or shaft(s) to transfer power along different power flow paths to achieve different speeds in forward and reverse directions as discussed more in FIG. 4.

FIG. 4 is an embodiment of a shift diagram corresponding to gear ratio changes within the transmission of FIG. 3, with eight forward speeds from Speeds 1 to 8 and eight reverse speeds from Speeds 1 to 8. Here, the forward and reverse Speeds 1 to 8 are illustrated in successive rows, with each speed achievable via a power flow path through the transmission of FIG. 3. For example, forward Speed 1 may be achieved by engaging the forward coupler F of the forward-reverse coupler 66 and the clutches IN1, MID1, and OUT1 (e.g., designated as 'X'), forward Speed 2 may be achieved by engaging the forward coupler F of the forward-reverse coupler and the clutches IN2, MID1, and OUT1, and so on with the engaged clutches designated with an "X". Reverse Speed 1 may be achieved by engaging the reverse coupler R of the forward-reverse coupler and the clutches IN1, MID1, and OUT1 (e.g., designated as 'X'), reverse Speed 2 may be achieved by engaging the reverse coupler R of the forward-reverse coupler and the clutches IN2, MID1, and OUT1, and so on with the engaged clutches designated with an "X". The gears in the transmission 24 are arranged such that when power-shifts are performed from forward Speed 1 to Speed 8 and from reverse Speed 1 to Speed 8 (e.g., down the rows), the total gear ratio (e.g., speed of the input shaft divided by the speed of the output shaft) of the transmission decreases. Furthermore, a portion of the concepts described herein is focused on providing power-shuttle operation by using coupler(s) and/or synchronizer(s) (e.g., the forward-reverse coupler 66) in place of clutches (e.g., a forward clutch and a reverse clutch) to reduce parasitic losses attributed to clutch drag and/or to reduce potential for clutch plate flutter. It may be appreciated that synchronizers may drag much less than multi-plate clutches, and couplers may have substantially no drag, and neither synchronizers nor couplers are susceptible to flutter.

Figure 5:
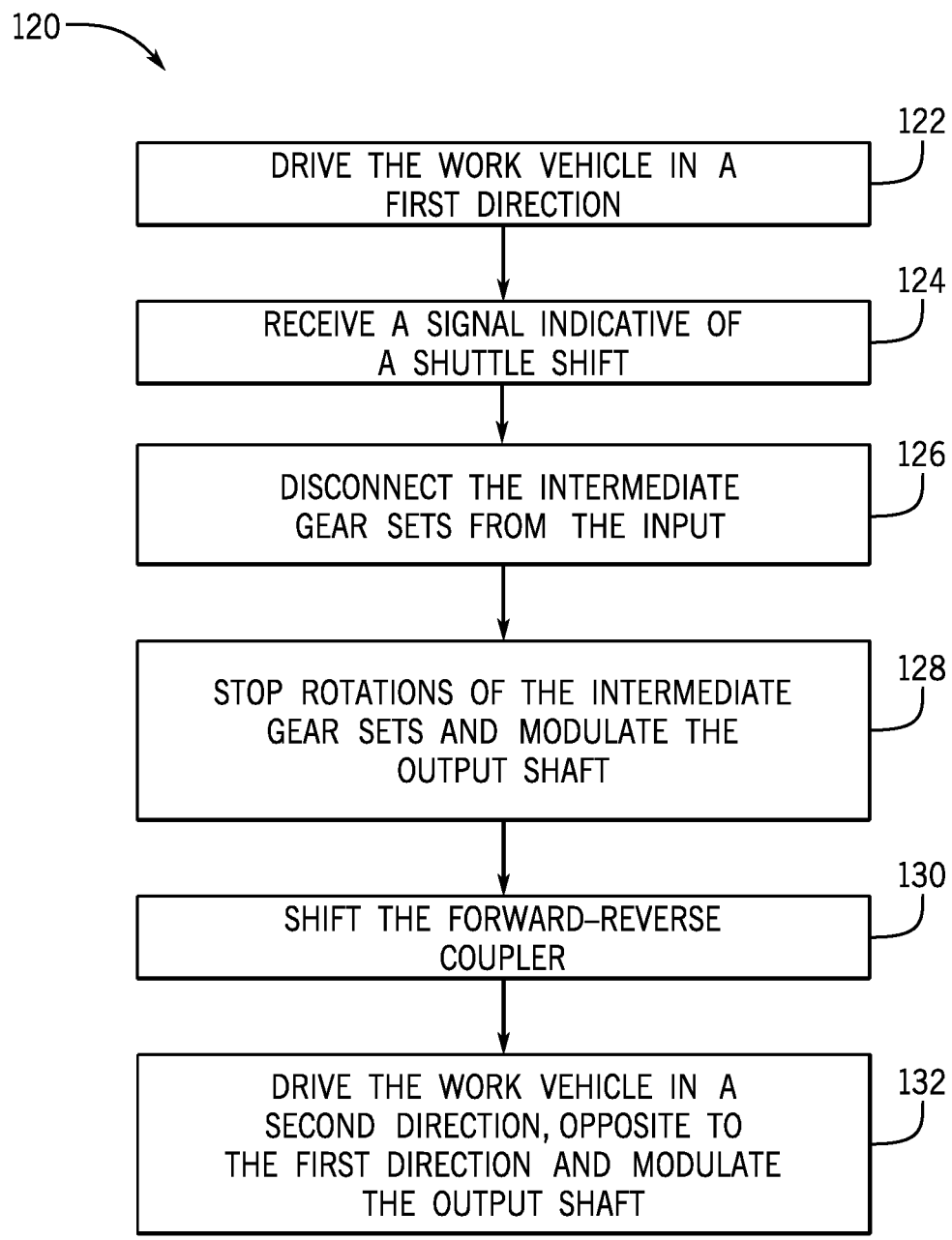
FIG. 5 is a flow chart of an embodiment of a method for performing a shuttle shift using the transmission system of FIG. 2, in accordance with the present disclosure.

FIG. 5 is a flow chart of an embodiment of a method 120 for performing a shuttle shift using the transmission of FIG. 3 to transition the work vehicle from driving in a first direction to a second direction, opposite to the first direction. The first direction and the second direction may be forward and reverse directions, respectively, or vice versa. As set forth in FIG. 4, the controller may engage/disengage respective clutches (IN1, IN2, MID1, MID2, OUT1, OUT2) and the forward-reverse coupler of the transmission of FIG. 3 to drive the work vehicle in any of the forward Speeds 1 to 8 or any of the reverse Speeds 1 to 8. The method 120 may be applied to perform shuttle shifting between any of the forward Speeds 1 to 8 and any of the reverse Speeds 1 to 8.

One or more of the steps of the method 120 may be executed by the controller. The method 120 may include instructing the engine and the transmission to drive (step 122) the work vehicle in a first direction (e.g., forward direction). The controller may instruct the transmission to engage clutches and forward-reverse coupler corresponding to a particular speed in the first direction. For example, for forward Speed 3, the controller may instruct the transmission to engage the clutches IN1, MID2, and OUT1, and the forward coupler F. The method 120 may include receiving (step 124) a signal indicative of a shuttle shift. For example, the controller may receive a signal in response to an operator or a driver of the work vehicle signaling a shuttle shift (e.g., via a shuttle-shift lever). In some embodiment, step 124 may be omitted.

The method 120 includes instructing the transmission to disconnect the intermediate gear sets 81 (e.g., the gear sets G3, G4, and G5) from the input 42. The controller may instruct the transmission to disengage at least one clutch disposed on the respective power flow path to disconnect the intermediate gear sets 81 from the input 42. For example, if the engine drives the work vehicle at forward Speed 3, the forward coupler F is engaged, and step 126 may include instructing the transmission to disengage the clutch IN1 and engage the clutch MID1 to stop rotation of the second shaft 50. The disengagement of the clutch IN1 (e.g., disengagement of at least one clutch) disconnects the input shaft 48 from the second shaft 50, such that rotation of the input shaft 48 does not drive the second shaft 50 to rotate with the input shaft 48, which in turn also disconnects the intermediate gear sets 81 from the input 42.

The method 120 includes instructing the transmission to stop (step 128) rotation of the intermediate gear sets 81 (e.g., the gear sets G3, G4, and G5) and modulate the output shaft 56. The controller may instruct the transmission to engage and/or disengage respective clutches to stop rotations of the intermediate gear sets 81 (e.g., the gear sets G3, G4, and G5), which in turn stops rotations of the associated shafts (e.g., the second, third, and fourth shafts 50, 52, and 54), such that the forward-reverse coupler 66 may be shifted between the forward coupler F and the reverse coupler R. The controller may instruct the transmission to engage at least two clutches (e.g., clutches disposed on different power flow paths) to stop rotation of the intermediate gear sets 81. For example, while the clutch MID2 is engaged, the engagement of the clutch MID1 induces a conflict between the clutches, and thus causes the third and fourth shafts 52 and 54 to stop rotation. As the third shaft 52 stops rotation, the second shaft 50 also stops rotation because the second shaft 50 has been disconnected from the input 42 and remains connected to the third shaft 52 via the clutch MID1, the shaft 68, the gear 92, the gear 90, the shaft 64, and the forward coupler F. As such, by disengaging the clutch IN1 and engaging the clutch MID1 (while the clutch MID2 is engaged), the intermediate gear sets 81 (e.g., the gear sets G3, G4, and G5) and the associated shafts (e.g., the second, third, and fourth shafts 50, 52, and 54) stop rotation.

It should be noted that even if the intermediate gear sets 81 and the associated shafts have stopped rotation, the output shaft 56 may still be rotating due to the inertia of the load. The controller may instruct the transmission to modulate the output shaft 56 by instructing the respective output clutch to apply a braking torque to the output shaft 56. For example, when shifting from forward Speed 3 to a reverse speed, the controller may instruct the transmission to modulate the pressure applied to the clutch OUT1, such that the torque transmitted by the clutch OUT1 is controlled, to provide braking to the output shaft 56 (e.g., to decelerate the rotation speed of the output shaft 56 at a controlled rate to provide a suitable rate of deceleration of the work vehicle).

The method 120 includes instructing the transmission to shift (step 130) the forward-reverse coupler 66 between the forward coupler F and the reverse coupler R and modulate the output shaft 56. Once the second shaft 50 stops rotation, the controller may instruct the transmission to shift the forward-reverse coupler 66. For example, for shifting from a forward direction to a reverse direction, the controller may instruct the transmission to disengage the forward coupler F and engage the reverse coupler R. At the same time, the controller may continue to instruct the transmission to modulate the output shaft to continue decelerating the work vehicle.

The method 120 includes instructing the transmission to engage and/or disengage respective clutches to drive (step 132) the work vehicle in a second direction (e.g., opposite to the first direction) and modulate the output shaft 56. For example, for reverse Speed 3, while the reverse coupler R is engaged, the controller may instruct the transmission to maintain engagement of the clutch MID2, disengage the clutch MID 1, engage the clutch IN1, and continue to modulate the pressure applied to the clutch OUT1. As such the work vehicle may start accelerating in the second direction (e.g., reverse Speed 3). To minimize the amount of energy absorbed by the clutch OUT1 and OUT2, the controller may wait to instruct the transmission to accelerate in the second direction until the rotation speed of the output shaft 56 is close to zero. During the period that the work vehicle decelerates to a substantially zero speed (e.g., the output shaft 56 has a substantially zero rotation per minute (rpm)) and accelerates in the second direction (e.g., in reverse Speed 3), the controller may continue modulating the output shaft 56 to ensure a smooth shuttle shift transition. The controller may instruct the transmission to modulate the output shaft 56 till the output clutch is locked-up (e.g., the shaft 74 and the output shaft 56 are rotating at the same or substantially the same speed). To the extent, the clutch OUT1 may be viewed as an inching clutch that provides torque to the output shaft 56 to decelerate and accelerate the work vehicle smoothly throughout the shuttle shift.

Figure 6:
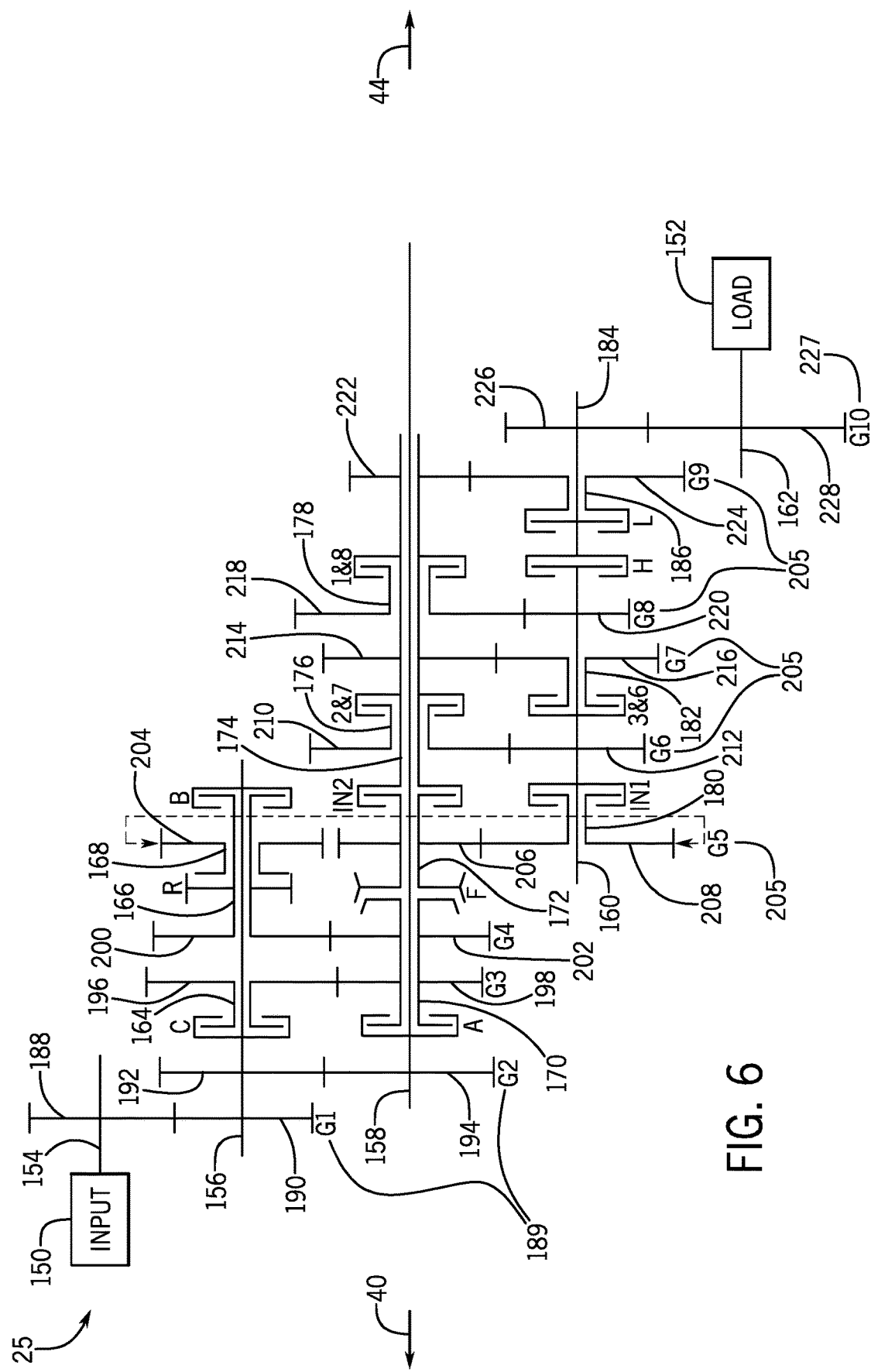
FIG. 6 is a schematic diagram of another embodiment of a transmission that may be used within the transmission system of FIG. 2, in accordance with the present disclosure.

FIG. 6 is a schematic diagram of another embodiment of a transmission that may be used within the transmission system of FIG. 2. In the following descriptions, the axial direction 40 pointing toward an input 150 is referred to as "front", whereas an axial direction 44 pointing toward a load or output 152 is referred to as "rear". The input 150 may be a motor or the engine 22 and the load or output 152 may be the load 26 as shown in FIG. 2. In the illustrated embodiment, the transmission 25 includes an input shaft or a first shaft 154, a second shaft 156, a third shaft 158, a fourth shaft 160, and an output shaft 162, that are parallel to one another. To the extent that the second shaft 156 rotates with the input shaft 154, the second shaft 156 may also be considered as an input shaft. The transmission 25 includes shafts disposed between the input shaft 154 and the output shaft 162 (e.g., the second, third, and fourth shafts 156, 158, and 160, and shafts disposed thereon, such as shafts 164, 166, 168, 170, 172, 174, 176, 180, and 182). The input shaft 154 is driven by the input 150. Arranged on the second shaft 156, a shaft 164 is selectively fixedly coupled to the second shaft 156 by a clutch C, a shaft 166 is selectively fixedly coupled to the second shaft 156 by a clutch B, and a shaft 168 is selectively fixedly coupled to the shaft 166 by a reverse coupler or synchronizer R. As illustrated, the second shaft 156 is an inner shaft that is concentrically disposed within the shafts 164 and 166, and the shaft 166 is an inner shaft that is concentrically disposed within the shaft 168.

Arranged on the third shaft 158, a shaft 170 is selectively fixedly coupled to the third shaft 158 by a clutch A, a shaft 172 is selectively fixedly coupled to the shaft 170 by a forward synchronizer or coupler F, and a shaft 174 is selectively fixedly coupled to the shaft 172 by a clutch IN2. Also arranged on the third shaft 158, a shaft 176 is selectively fixedly coupled to the shaft 174 by a clutch 2&7, and a shaft 178 is selectively fixedly coupled to the shaft 174 by a clutch 1&8. As illustrated, the third shaft 158 is an inner shaft that is concentrically disposed within the shafts 170, 172, and 174, and the shaft 174 is an inner shaft that is concentrically disposed within the shafts 176 and 178.

Arranged on the fourth shaft 160, shafts 180 and 182 are selectively fixedly coupled to the fourth shaft 160 by a clutch IN1 and a clutch 3&6, respectively. A shaft 184 is selectively fixedly coupled to the fourth shaft 160 by a clutch H, and a shaft 186 is selectively fixedly coupled to the shaft 184 by a clutch L. As illustrated, the fourth shaft 160 is an inner shaft that is concentrically disposed within the shafts 180 and 182, and the shaft 184 is an inner shaft that is concentrically disposed with the shaft 186. To the extent that the shaft 184 rotates with the output shaft 162, the shaft 184 may also be considered as an output shaft.

Arranged between the input shaft 154 and the output shaft 162 along the axial direction pointing toward the rear 44, are ten gear sets G1, G2, G3, G4, G5, G6, G7, G8, G9, and G10 that are each formed by respective gears 188/190, 192/194, 196/198, 200/202, 204/206/208, 210/212, 214/216, 218/220, 222/224, and 226/228. In the illustrated embodiment, the gear sets G1 and G2 are referred to as front gear sets 189, the gear sets G5, G6, G7, G8, and G9 are referred to as intermediate gear sets 205, and the gear set G10 is referred to as a rear gear set 227. The gears 188 and 190 are fixedly coupled to the input shaft 154 and the second shaft 156, respectively, the gears 192 and 194 are fixedly coupled to the second shaft 156 and the third shaft 158, respectively, and the gears 196 and 198 are fixedly coupled to the shafts 164 and 170, respectively. The gears 200 and 202 are fixedly coupled to the shafts 166 and 170, respectively, and the gears 204, 206, and 208 are fixedly coupled to the shafts 168, 172, and 180, respectively. The gears 210 and 212 are fixedly coupled to the shaft 176 and the fourth shaft 160, respectively, the gears 214 and 216 are fixedly coupled to the shafts 174 and 182, respectively, and the gears 218 and 220 are fixedly coupled to the shaft 178 and the fourth shaft 160, respectively. The gears 222 and 224 are fixedly coupled to the shafts 174 and 186, respectively, and the gears 226 and 228 are fixedly coupled to the shaft 184 and the output shaft 162, respectively. The clutches C and A are disposed between the gear sets G2 and G3, the reverse coupler or synchronizer R and the forward synchronizer or coupler F are disposed between the gear sets G4 and G5, the clutches B, IN2 and IN1 are disposed between the gear sets G5 and G6, the clutches 2&7 and 3&6 are disposed between the gear sets G6 and G7, and the clutches 1&8, H, and L are disposed between the gear sets G8 and G9.

In addition, the transmission 25 of FIG. 6 may include one or more speed sensors, each configured to output a respective signal indicative of the rotational speed of a respective shaft. The speed sensor(s) may include reflective sensor(s), interrupter sensor(s), optical sensor(s), magnetic sensor(s), Hall-effect sensor(s), other suitable types of sensor(s), or a combination thereof. The speed sensor(s) may continuously, periodically, or upon receiving an instruction from the controller 28, measure and output signals indicative of rotational speed to the controller 28. Based on the signals from the speed sensor(s), the controller 28 may determine the rotational speed of respective shaft(s) of the transmission 25 and may determine whether respective clutch(es) of the transmission 25 are locked-up. For example, the speed sensor(s) may measure and output signals indicative of rotational speeds of the respective shaft(s), such that the controller 28 may determine that the respective shaft(s) have stopped rotation. Furthermore, the speed sensor(s) may measure and output signals indicative of rotational speeds of the shaft 186 and the shaft 184, such that the controller 28 may determine that the clutch L is locked-up (e.g., the shaft 186 and the shaft 184 are rotating at the same or substantially the same speed). The speed sensor(s) may measure and output signals indicative of rotational speeds of the fourth shaft 160 and the shaft 184, such that the controller 28 may determine that the clutch H is locked-up (e.g., the fourth shaft 160 and the shaft 184 are rotating at the same or substantially the same speed).

The clutches described herein may be any suitable type(s) of clutch(es) including dry clutch(es), wet clutch(es), single/multi plate clutch(es), centrifugal clutch(es), pneumatic or hydraulic clutch(es), electromagnetic clutch(es), or any combination thereof. Each of the clutches may be configured to selectively couple a gear to a shaft or selectively couple a shaft to another shaft upon receiving a control signal from the controller (e.g., the controller 28). The couplers described herein may be any suitable type(s) of coupler(s) including gear coupler(s), disc coupler(s), jaw coupler(s), another suitable coupler(s), or any combination thereof. In addition, a coupler may include a synchronizer (e.g., a coupler having a synchronizer is referred to as a "synchronizer"). The synchronizers described herein may be any suitable type(s) of synchronizer(s) including single-cone synchronizer(s), dual-cone synchronizer(s), triple-cone synchronizer(s), another suitable type of synchronizer(s), or any combination thereof. Each of the couplers may be configured to selectively allow engagement of gears, engagement of a gear and a shaft, or engagement of shafts (e.g., synchronizing the rotation speeds of the respective engaging components) upon receiving a control signal from the controller (e.g., the controller 28).

The described system of gears and shafts can be actuated with the clutches (C, A, B, IN2, IN1, 2&7, 3&6, 1&8, H, and L) and the coupler and/or synchronizer F and R to achieve different gear ratios (e.g., speeds) between the input shaft 154 and the output shaft 162 in forward and reverse directions. For example, the clutches and the coupler(s) and/or synchronizer(s) may be controlled (e.g., via the controller 28) to control engagement and/or disengagement of each clutch and the coupler(s) and/or synchronizer(s) with their respective gear(s) and/or shaft(s) to transfer power along different power flow paths to achieve different speeds in forward and reverse directions as discussed more in FIG. 7.

FIG. 7 is another embodiment of a shift diagram corresponding to gear ratio changes within the transmission of FIG. 6, with twenty-four forward speeds from Speeds 1 to 24 and twenty-four reverse speeds from Speeds 1 to 24. Here, the forward and reverse Speeds 1 to 24 are illustrated in successive rows, with each speed achievable via a power flow path through the transmission of FIG. 6. For example, forward Speed 1 may be achieved by engaging the forward synchronizer or coupler F and the clutches A, IN1, 1&8, and L (e.g., designated as 'X'), forward Speed 2 may be achieved by engaging the forward synchronizer or coupler F and the clutches B, IN1, 1&8, and L, and so on with the engaged clutches designated with an "X". Reverse Speed 1 may be achieved by engaging the reverse coupler or synchronizer R and the clutches A, IN1, 1&8, and L (e.g., designated as 'X'), reverse Speed 2 may be achieved by engaging the reverse coupler or synchronizer R and the clutches B, IN1, 1&8, and L, and so on with the engaged clutches designated with an "X". It should be noted that for some speeds, the clutches are designated as "Opt", which indicates that the clutch may be engaged, but the clutch is not in the torque path. The gears in the transmission are arranged such that when power-shifts are performed from forward Speed 1 to Speed 24 and from reverse Speed 1 to Speed 24 (e.g., down the rows), the total gear ratio (e.g., speed of the input shaft divided by speed of the output shaft) of the transmission decreases. Furthermore, a portion of the concepts described herein is focused on providing power-shuttle operation by using coupler(s) and/or synchronizer(s) (e.g., the forward synchronizer or coupler F and the reverse coupler or synchronizer R) in place of clutches (e.g., a forward clutch and a reverse clutch) to reduce parasitic losses attributed to clutch drag and/or reduce potential for clutch plate flutter. It may be appreciated that synchronizers may drag much less than multi-plate clutches, and couplers may have substantially no drag, and neither synchronizers nor couplers are susceptible to flutter.

The method 120 shown in FIG. 5 may also be performed using the transmission of FIG. 6 to shuttle shift between forward and reverse speeds. As set forth in FIG. 7, the controller 28 may engage and/or disengage the respective clutches (IN1, IN2, 1&8, 2&7, 3&6, L, and H) and the forward and reverse couplers or synchronizers F and R of the transmission of FIG. 6 to drive the work vehicle 10 in any of the forward Speeds 1 to 24 or any of the reverse Speeds 1 to 24. The method 120 may be applied to perform shuttle shifting between any of the forward Speeds 1 to 24 and any of the reverse Speeds 1 to 24.

In step 122, the controller may instruct the transmission of FIG. 6 to engage respective clutches and forward and reverse couplers or synchronizers F and R to drive the work vehicle at a corresponding speed in a first direction. For example, for forward Speed 16, the controller may instruct the transmission to engage the clutches A, IN2, 3&6, and H, and the forward coupler or synchronizer F. In step 124, the controller may receive a signal in response to an operator or a driver of the work vehicle signaling a shuttle shift (e.g., via a shuttle-shift lever). In some embodiments, step 124 may be omitted.

In step 126, the controller may instruct the transmission to disconnect the intermediate gear sets 205 (e.g., the gear sets G5, G6, G7, G8, and G9) from the input 150. The controller may instruct the transmission to disengage at least one clutch disposed on the respective power flow path (e.g., clutches A, B, and/or C depending on the power flow path) to disconnect the intermediate gear sets 205 from the input 150. For example, the controller may instruct the transmission to disengage the clutches A, B, and C to disconnect the shafts 170, 164, and 166 and the gear sets G3 and G4 from the second and third shafts 156 and 158, such that rotation of the input shaft 154 does not drive rotation of the shafts 170, 164, and 166 and the gear sets G3 and G4, the intermediate gear sets 205, and the associated shafts (e.g., the fourth shaft 160 and the shafts 168, 172, 174, 176, 178, 180, 182, and 186).

In step 128, the controller may instruct the transmission to stop rotation of the intermediate gear sets 205 (e.g., the gear sets G5, G6, G7, G8, and G9) and modulate the output shaft 162. The controller may instruct the transmission to disengage at least one clutch (e.g., clutches disposed before the rear gear set 227 toward the axial direction 44) to disconnect the intermediate gear sets 205 from the load or output 152. The controller may instruct the transmission to engage at least three clutches (e.g., clutches disposed on different power flow paths) to stop rotation of the intermediate gear sets 205 and the associated shafts. For example, the controller may instruct the transmission to disengage the clutches L and H to disconnect the intermediate gear sets 205 and the associated shafts from the output shaft 162, and engage at least three of the clutches IN1, IN2, 1&8, 2&7, and 3&6 to stop rotation of the intermediate gear sets 205 in the transmission. The engagement of at least three of the clutches IN1, IN2, 1&8, 2&7, and 3&6 induce conflicts among the clutches, and thus cause the intermediate gear sets 205 (e.g., the gear sets G5, G6, G7, G8, and G9) and the associated shafts to stop rotation. It should be noted that the shaft 184 and the output shaft 162 may still rotate due to the inertia of the load. Thus, in step 128, the controller may instruct the transmission to modulate the pressure applied to an output clutch (e.g., the clutch L or the clutch H) to provide braking to the output shaft 162 (e.g., to decelerate the rotation speed of the shaft 184 and thus decelerating the rotation speed of the output shaft 162 at a controlled rate to provide a suitable rate of deceleration of the work vehicle).

In step 130, once the shafts 168 and 172 stop rotation, the shafts 166 and 170 also stop rotation because the forward coupler or synchronizer F or the reverse coupler or synchronizer R is still engaged, and the controller may instruct the transmission to shift between the forward coupler or synchronizer F and the reverse coupler or synchronizer R. For example, to shuttle shift from a forward direction (e.g., a first direction) to a reverse direction (e.g., a second direction), the controller may instruct the transmission to disengage the forward coupler or synchronizer F and engage the reverse coupler or synchronizer R. At the same time, the controller may instruct the transmission to continue modulating the output shaft (e.g., modulating a pressure applied to an output clutch, the clutch L or the clutch H) to continue decelerating the work vehicle.

In step 132, the controller may instruct the transmission to engage and/or disengage respective clutches to drive the work vehicle in the second direction (e.g., opposite to the first direction) and modulate the output shaft 162 (e.g., modulating a pressure applied to an output clutch, the clutch L or the clutch H). For example, for reverse Speed 1, while the reverse coupler or synchronizer R is engaged, the controller may instruct the transmission to maintain disengagements of the clutch B and C, engage the clutch A, engage or maintain engagement of the clutch IN1, disengage or maintain disengagement of the clutch IN2, the clutch 2&7, and the clutch 3&6, engage or maintain engagement of the clutch 1&8, and continue to modulate the pressure applied to the clutch L. As such the work vehicle may start accelerating in the second direction (e.g., reverse Speed 1). To minimize the amount of energy absorbed by the clutch L, the controller may wait to instruct the transmission to drive the work vehicle in the second direction until the rotation speed of the output shaft 162 is close to zero. During the period that the work vehicle decelerates to a substantially zero speed (e.g., the output shaft 162 has a substantially zero rotation per minute (rpm)) and accelerates in the second direction (e.g., in reverse Speed 1), the controller may continue modulating the output shaft 162 (e.g., modulating a pressure applied to an output clutch, the clutch L or the clutch H) to ensure a smooth shuttle shift transition. The controller may instruct the transmission to modulate the output shaft 162 till the clutch L is locked-up (e.g., the shaft 186 and the shaft 184 are rotating at the same or substantially the same speed). To the extent, the clutch L may be viewed as an inching clutch that provides torque to the output shaft 162 to decelerate and accelerate the work vehicle smoothly throughout the shuttle shift.

In some embodiments, some steps of the method 120 may be generally applicable to the controller (e.g., the controller 28) performing stationary shuttling (e.g., disengaging one of the couplers or synchronizers and engaging the other coupler or synchronizer while the work vehicle 10 is stationary) using the transmission of FIG. 6. For example, in step 128, the controller may engage at least three of the clutches IN1, IN2, 1&8, 2&7, and 3&6 to stop rotation of most of the components in the transmission between the input and output shafts 154 and 162. However, this combination of clutches may already be engaged to stop rotation of the components while the work vehicle is stationary, to prevent creep of the work vehicle that could otherwise occur caused by clutch drag.

In some embodiments, the transmission of FIG. 6 may include a forward coupler F and a reverse coupler R (e.g., as opposed to a coupler and a synchronizer), and the parasitic losses is reduced as compared to a transmission including a coupler and a synchronizer. If both the forward coupler F and the reverse coupler R are in their neutral positions, and the input shaft 154 is rotating, there is no way to force shafts 166 and 170 to stop to allow engaging the forward coupler F or the reverse coupler R without clashing. The controller may be configured to ensure that at least one of the forward coupler F and the reverse coupler R is not in neutral position. The controller may instruct the transmission to maintain engagement of at least one of the forward coupler F and the reverse coupler R at all times.

In some embodiments, the transmission of FIG. 6 may include a forward synchronizer F and a reverse synchronizer R (as opposed to a coupler and a synchronizer, or both couplers). In some embodiments, such as the illustrated embodiment shown in FIG. 6, the transmission may include a forward synchronizer F and a reverse coupler R (as opposed to two couplers or two synchronizers). In these two cases, the controller does not need to specifically instruct the transmission to circumvent the situation that both the forward and reverse couplers F and R are in neutral positions, as set forth above. In the case of a forward synchronizer F and a reverse coupler R, the controller may instruct the transmission to shift from neutral to reverse by instructing the transmission to engage the forward synchronizer F, thus stopping rotation of the shafts 166 and 170, then engage the reverse coupler R and disengage the forward synchronizer F. Using a reverse coupler R may minimize drag losses when driving in forward direction. Furthermore, the controller may instruct the transmission to shift both the forward synchronizer F and the reverse coupler R to neutral positions while the work vehicle is in neutral or park position to reduce parasitic losses during stationary power take off (PTO) operation. Still in some embodiments, the transmission of FIG. 6 may include a forward coupler F and a reverse synchronizer R (as opposed to a forward synchronizer F and a reverse coupler R).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A transmission system for a work vehicle, comprising a transmission, comprising:
   one or more input shafts coupled to an input;
   one or more output shafts coupled to a load;
   a plurality of shafts disposed between the one or more input shafts and the one or more output shafts;
   a plurality of gear sets disposed on the plurality of shafts, wherein the plurality of gear sets comprise intermediate gear sets;
   a plurality of clutches disposed along the plurality of shafts, wherein each of the plurality of clutches is configured to selectively couple a respective gear set of the plurality of gear sets corresponding to a respective power flow path of the transmission;
   a forward coupler disposed on one of the plurality of shafts; and
   a reverse coupler disposed on one of the plurality of shafts; and
   a controller communicatively coupled to the plurality of clutches, the forward coupler, and the reverse coupler, wherein the controller is configured to receive a signal indicative of a shuttle shift, and in response to receiving the signal, instruct the plurality of clutches to stop rotation of the intermediate gear sets and subsequently swap engagement of the forward coupler and the reverse coupler to shuttle shift between forward and reverse directions.

2. The transmission of claim 1, wherein the controller is configured to change a pressure applied to a respective output clutch to modulate rotation of the one or more output shafts during the shuttle shift.

3. The transmission of claim 1, wherein at least one of the forward coupler and the reverse coupler comprises a synchronizer.

4. The transmission system of claim 1, wherein the forward coupler and the reverse coupler are disposed on a same shaft of the plurality of shafts.

5. The transmission of claim 1, wherein the forward coupler and the reverse coupler are disposed on different shafts of the plurality of shafts, and the forward coupler comprises a synchronizer.

6. The transmission system of claim 1, wherein the controller is configured to selectively disengage at least one clutch disposed on the respective power flow path to disengage the intermediate gear sets from the input before stopping rotation of the intermediate gear sets.

7. The transmission system of claim 6, wherein instructing the plurality of clutches to stop rotation of the intermediate gear sets comprises selectively engaging at least two clutches of the plurality of clutches disposed on the plurality of shafts.

8. The transmission system of claim 6, wherein instructing the plurality of clutches to stop rotation of the intermediate gear sets comprises selectively engaging at least three clutches of the plurality of clutches disposed on the plurality of shafts.

9. A method for shuttle shifting a work vehicle, via a controller, comprising:
   receiving a signal indicative of a shuttle shift;
   in response to receiving the signal, instructing a plurality of clutches to stop rotation of intermediate gear sets of a plurality of gear sets disposed on a plurality of shafts, wherein the plurality of shafts are disposed between one or more input shafts coupled to an input and one or more output shafts coupled to a load, and each of the plurality of clutches is configured to selectively couple a respective gear set of the plurality of gear sets corresponding to a respective power flow path of a transmission of the work vehicle;
   subsequently instructing swapping engagement of a forward coupler and a reverse coupler to shuttle shift between forward and reverse directions; and
   instructing modulating the one or more output shafts during the shuttle shift.

10. The method of claim 9, comprising instructing disengagement of at least one clutch disposed on the respective power flow path to disengage the intermediate gear sets from the input before stopping rotation of the intermediate gear sets.

11. The method of claim 10, wherein instructing the plurality of clutches to stop rotation of the intermediate gear sets comprises instructing selective engagement of at least two clutches disposed on the plurality of shafts.

12. The method of claim 10, wherein instructing the plurality of clutches to stop rotation of the intermediate gear sets comprises instructing selective engagement of at least three clutches disposed on the plurality of shafts.

13. The method of claim 9, wherein swapping engagement of the forward coupler and the reverse coupler comprises swapping engagement of the forward coupler and the reverse coupler disposed on a same shaft of the plurality of shafts.

14. The method of claim 9, wherein swapping engagement of the forward coupler and the reverse coupler comprises swapping engagement of the forward coupler disposed on one shaft of the plurality of shafts and swapping engagement of the reverse coupler disposed on another shaft of the plurality of shafts.

15. The method of claim 9, wherein swapping engagement of the forward coupler and the reverse coupler comprises swapping engagement of at least one synchronizer.

16. The method of claim 9, wherein instructing modulating the output shaft comprises instructing modulating a pressure applied to a respective output clutch to modulate rotation of the one or more output shafts.

17. An apparatus comprising:
   at least one non-transitory memory storing instructions for execution by a processor, the instructions comprising:
   instructions to receive a signal indicative of a shuttle shift;

instructions to a plurality of clutches to stop rotation of intermediate gear sets of a plurality of gear sets disposed on a plurality of shafts of a transmission, wherein the plurality of clutches are disposed along the plurality of shafts disposed between one or more input shafts coupled to an input and one or more output shafts coupled to a load, wherein each of the plurality of clutches is configured to selectively couple a respective gear set of the plurality of gear sets corresponding to a respective power flow path of the transmission;

instructions to swap engagement of a forward coupler and a reverse coupler to shuttle shift between forward and reverse directions; and instructions to modulate a pressure applied to a respective output clutch of the plurality of clutches to modulate rotation of the one or more output shafts during the shuttle shift.

18. The apparatus of claim 17, wherein the instructions to swap engagement of the forward coupler and the reverse coupler comprise instructions to swap engagement of at least one synchronizer.

19. The apparatus of claim 17, wherein the instructions comprise instructions to disengage at least one clutch disposed on the respective power flow path.

20. The apparatus of claim 19, wherein the instructions to stop rotation of the intermediate gear sets comprise instructions to selectively engage at least two clutches of the plurality of clutches disposed on the plurality of shafts.

* * * * *